(12) United States Patent
Haga

(10) Patent No.: US 8,250,209 B2
(45) Date of Patent: Aug. 21, 2012

(54) MANAGEMENT SYSTEM, MANAGING METHOD AND CONTROL PROGRAM

(75) Inventor: Tatsuyoshi Haga, Hachioji (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 302 days.

(21) Appl. No.: 12/573,538

(22) Filed: Oct. 5, 2009

(65) Prior Publication Data
US 2010/0088409 A1    Apr. 8, 2010

(30) Foreign Application Priority Data

Oct. 8, 2008    (JP) .................................. 2008-262111

(51) Int. Cl.
G06F 15/173    (2006.01)
(52) U.S. Cl. ........................................ 709/224; 709/223
(58) Field of Classification Search .................. 709/223, 709/224, 201–203, 208–210
See application file for complete search history.

(56) References Cited

U.S. PATENT DOCUMENTS

| | | | | |
|---|---|---|---|---|
| 6,021,430 A * | 2/2000 | Brandt et al. | ................. | 709/213 |
| 6,154,782 A * | 11/2000 | Kawaguchi et al. | .......... | 709/239 |
| 6,714,971 B2 * | 3/2004 | Motoyama et al. | ........... | 709/219 |
| 7,043,551 B2 * | 5/2006 | Motoyama et al. | ........... | 709/224 |
| 7,137,030 B2 * | 11/2006 | Jung et al. | ........................ | 714/13 |
| 7,266,601 B2 * | 9/2007 | Maekawa et al. | ............. | 709/224 |
| 7,353,273 B2 * | 4/2008 | Motoyama et al. | ........... | 709/224 |
| 7,600,018 B2 * | 10/2009 | Maekawa et al. | ............. | 709/224 |
| 7,930,375 B2 * | 4/2011 | Yamauchi | ..................... | 709/221 |
| 8,086,720 B2 * | 12/2011 | Breese et al. | ................. | 709/224 |
| 2003/0014511 A1 * | 1/2003 | Maekawa et al. | ............. | 709/223 |
| 2004/0158632 A1 * | 8/2004 | Sasaki | ........................... | 709/224 |
| 2005/0246439 A1 * | 11/2005 | Fong et al. | .................... | 709/224 |
| 2006/0098634 A1 * | 5/2006 | Umemoto et al. | ............. | 370/352 |
| 2008/0016210 A1 * | 1/2008 | Maekawa et al. | ............. | 709/224 |
| 2008/0026788 A1 * | 1/2008 | Hamada | ..................... | 455/552.1 |
| 2008/0040480 A1 * | 2/2008 | Motoyama et al. | ........... | 709/224 |
| 2008/0065766 A1 * | 3/2008 | Motoyama et al. | ........... | 709/224 |
| 2011/0182216 A1 * | 7/2011 | Ono et al. | ..................... | 370/282 |

FOREIGN PATENT DOCUMENTS

| JP | 2005-145173 | 5/2001 |
|---|---|---|
| JP | 2005-45416 | 2/2005 |

* cited by examiner

*Primary Examiner* — Moustafa M. Meky
*Assistant Examiner* — Sargon Nano
(74) *Attorney, Agent, or Firm* — Finnegan, Henderson, Farabow, Garrett & Dunner, L.L.P.

(57) ABSTRACT

Disclosed is a management system, which makes it possible to securely maintain the communication between the managing apparatus (host) and the managed apparatus (device) even when a certain malfunction has occurred in the network or the server. When the device cannot receive the request sent from the host, the device changes the communication mode from the bilateral communication mode to the unilateral communication mode, and then, when it becomes possible to receive the request, the device changes the communication mode from the unilateral communication mode to the bilateral communication mode to transmit the response to the host. Further, when the host cannot transmit the request to the device, or when the host cannot receive the response to the request, the host suspends an operation for transmitting the request, and then, when it becomes possible to receive the response to the request, the host resumes the operation for transmitting the request.

11 Claims, 9 Drawing Sheets

MANAGEMENT SYSTEM, MANAGING METHOD AND CONTROL PROGRAM

This application is based on Japanese Patent Application NO. 2008-262111 filed on Oct. 8, 2008, with Japan Patent Office, the entire content of which is hereby incorporated by reference.

BACKGROUND OF THE INVENTION

The present invention relates to a management system, a managing method and a control program, and specifically relates to a management system in which a managing apparatus and a managed apparatus can communicate with each other in either a bilateral communication mode or a unilateral communication mode, a managing method to be employed for the management system concerned and a control program to be executed in the managing apparatus and the managed apparatus concerned.

In recent years, there have been increasingly proliferated in the market, a copier, a MFP (Multi Function Peripheral), etc., each of which is provided with a copy function, a facsimile function, a printer function, a scanner function, etc., (hereinafter, referred to as an image forming apparatus as a general term for each of them). Since an operating ratio of such the image forming apparatus is relatively high and it is necessary for the user to periodically apply maintenance and inspection processing to such the image forming apparatus due to a wide variety of consumable parts used for such the image forming apparatus, the image forming apparatus, serving as the managed apparatus, is coupled to the managing apparatus through a certain communication network, so that the managing apparatus acquires control information, such as a number of paper sheets to be printed, a usage frequency, a maintenance history, a history of operations for changing various kinds of parts, etc., from the image forming apparatus concerned, so as to conduct operations for controlling the image forming apparatus concerned, based on the control information acquired.

Conventionally, there has been employed such a method that the image forming apparatus and the managing apparatus are coupled to each other through a conventional telephone line network and, in response to the telephone call from the managing apparatus, the image forming apparatus notifies the managing apparatus of current statuses of its own, as the method for acquiring the control information from the image forming apparatus concerned (hereinafter, this method is referred to as a telephone-line communication method). However, as for the abovementioned method, there has been such a problem that an ISDN (Integrated Services Digital Network) or the like should be employed as the telephone line network, resulting in a lack of a general purpose versatility of the system.

To solve the abovementioned problem, alternatively employed is such a method that the image forming apparatus and the managing apparatus are coupled to each other through a communication network such as an Internet or the like, so that the image forming apparatus itself creates an electronic mail in which current statuses of its own are described, in response to the E-mail received from the managing apparatus, and sends the created E-mail back to the managing apparatus (hereinafter, this method is referred to as an E-mail method).

Further, recently, there have been utilized a method in which data read/write operations from/to each of the managing apparatus and the image forming apparatuses are conducted by using an HTTP (Hypertext Transfer Protocol) server, such as a Web-DAV (Distributed Authoring and Versioning protocol for the WWW) server, etc., (hereinafter, this method is referred to as an HTTP method).

With respect to the communication control of the management system in which various kinds of communication methods, as abovementioned, are employed for conducting communicating operations, for instance, Tokkai 2001-145173 sets forth a method comprising: acquiring information in regard to apparatuses constituting the network system concerned, user's statuses and outside environmental information of the apparatus concerned; and conducting various kinds of operations, such as an operation for suspending an information notification operation, an operation for changing a notification destination and/or a range of information, an operation for changing a priority of information to be notified and an operation for changing setting and notification contents.

Further, Tokkai 2005-45416 sets forth a method for selecting a communication path and/or protocol on the basis of the priority order of the communication procedures, which is determined according to the factors, such as which communication path is currently available and whether the importance priority is given to the communication cost or the transmission reliability.

In the normal management system, there has been utilized such a bilateral communication that is established by transmitting a request from the managing apparatus (host) and sending a response for the request back to the managing apparatus (host) from the image forming apparatus (device). On the other hand, when a communication method depending on the network environment, such as the E-mail method, the HTTP method, etc., is employed, depending on a presence or absence of the security policy or the POP (Post Office Protocol) server, sometimes, there has been utilized such a unilateral communication that is established only by transmitting data to the managing apparatus (host) from the image forming apparatus (device).

In this connection, since the initial sequence with the managing apparatus (host) varies depending on the communication mode, such as the bilateral or unilateral mode, the coarse or tight coupling mode, etc., the parameters to be established in advance by the user, for instance, the network parameters (such as settings of POP server, account information, etc.), the determination in regard to whether or not concerned data should be encrypted (instruction is sent from the host side in the bilateral communication mode, while instruction is sent from the device side in the unilateral communication mode), also vary depending on the communication mode currently employed.

If all of the abovementioned parameters to be established by the user are recognized in advance and are fixed over the time in the future without being changed, there would arise no major problem. However, when a change of security policy or a malfunction of the server has occurred, there arises such a problem that it becomes impossible to transmit merely a minimum required data in case that a certain communication error occurs.

SUMMARY OF THE INVENTION

To overcome the abovementioned drawbacks in conventional management systems, it is one of objects of the present invention to provide a management system, a managing method and a control program, each of which makes it possible to securely maintain the communication between the managing apparatus and the managed apparatus even when a certain malfunction has occurred in the network or the server.

Accordingly, at least one of the objects of the present invention can be attained by any one of the management systems, the managing method and the computer readable storage mediums described as follows.

(1) According to a management system reflecting an aspect of the present invention, the management system that is to be operated on a communication network, comprises: a managing apparatus that is coupled to the communication network; and a managed apparatus that is coupled to the communication network; wherein a communication mode between the managing apparatus and the managed apparatus can be set at either a bilateral communication mode, in which the managing apparatus and the managed apparatus can bilaterally communicate with each other through the communication network, or a unilateral communication mode, in which only the managed apparatus can unilaterally communicate with the managing apparatus through the communication network, while in an initial communication state, the communication mode is set at the bilateral communication mode; and wherein the managed apparatus is provided with: a first controlling section to conduct such controlling operations that, when it is impossible to receive a request sent from the managing apparatus in the bilateral communication mode currently set, the first controlling section changes the communication mode from the bilateral communication mode to the unilateral communication mode and unilaterally transmits transmission data representing a predetermined content at a predetermined timing to the managing apparatus, and then, when it becomes possible to receive the request, the first controlling section changes the communication mode from the unilateral communication mode to the bilateral communication mode so as to transmit a response to the request back to the managing apparatus; and wherein the managing apparatus is provided with: a second controlling section to conduct such controlling operations that, when it is impossible to transmit the request to the managed apparatus, or when it is impossible to receive the response to the request, sent from the managed apparatus, the second controlling section suspends an operation for transmitting the request, and then, when it becomes possible to receive the response to the request, the second controlling section resumes the operation for transmitting the request.

(2) According to another aspect of the present invention, in the management system recited in item 1, the first controlling section transmits the transmission data attached with first switching information, which indicates a fact that the communication mode has been switched from the bilateral communication mode to the unilateral communication mode, while transmits the response to the request, attached with second switching information, which indicates a fact that the communication mode has been switched from the unilateral communication mode to the bilateral communication mode; and when determining that the first switching information is attached to the transmission data, the second controlling section suspends the operation for transmitting the request, while when determining that the second switching information is attached to the response to the request, the second controlling section resumes the operation for transmitting the request.

(3) According to still another aspect of the present invention, in the management system recited in item 1, when determining that it is impossible to transmit the transmission data or the response to the request, the first controlling section employs another communication method, so as to transmit setup data, to be used for establishing a communicative connection in the other communication method, to the managing apparatus.

(4) According to a managing method reflecting a still another aspect of the present invention, the managing method to be implemented in a management system in which a managing apparatus and a managed apparatus are communicatively coupled to each other through a communication network, and a communication mode between the managing apparatus and the managed apparatus can be set at either a bilateral communication mode, in which the managing apparatus and the managed apparatus can bilaterally communicate with each other through the communication network, or a unilateral communication mode, in which only the managed apparatus can unilaterally communicate with the managing apparatus through the communication network, while in an initial communication state, the communication mode is set at the bilateral communication mode, comprises: implementing a first processing that includes operations of: changing the communication mode from the bilateral communication mode to the unilateral communication mode in the managed apparatus, when it is impossible for the managed apparatus to receive a request sent from the managing apparatus in the bilateral communication mode currently set, and transmitting transmission data representing a predetermined content at a predetermined timing to the managing apparatus from the managed apparatus; and suspending an operation for transmitting the request in the managing apparatus, when it is impossible for the managing apparatus to transmit the request to the managed apparatus, or when it is impossible for the managing apparatus to receive the response to the request, sent from the managed apparatus; and implementing a second processing that includes operations of: changing the communication mode from the unilateral communication mode to the bilateral communication mode so as to transmit the response to the request back to the managing apparatus, when it becomes possible for the managed apparatus to receive the request; and then, resuming the operation for transmitting the request in the managing apparatus, when it becomes possible for the managing apparatus to receive the response to the request.

(5) According to a computer readable storage medium reflecting a still another aspect of the present invention, the computer readable storage medium stores a computer executable program to be executed by a computer of a managed apparatus, which is included in a management system in which a managing apparatus and the managed apparatus are communicatively coupled to each other through a communication network, and a communication mode between the managing apparatus and the managed apparatus can be set at either a bilateral communication mode, in which the managing apparatus and the managed apparatus can bilaterally communicate with each other through the communication network, or a unilateral communication mode, in which only the managed apparatus can unilaterally communicate with the managing apparatus through the communication network, while in an initial communication state, the communication mode is set at the bilateral communication mode, the program being executable by a computer to cause the computer to perform a process comprising: changing the communication mode from the bilateral communication mode to the unilateral communication mode, when it is impossible to receive a request sent from the managing apparatus in the bilateral communication mode currently set, and transmitting transmission data representing a predetermined content at a predetermined timing to the managing apparatus; and then, changing the communication mode from the unilateral communication mode to the bilateral communication mode so as to transmit a response to the request back to the managing apparatus, when it becomes possible to receive the request.

(6) According to a computer readable storage medium reflecting a yet another aspect of the present invention, the computer readable storage medium stores a computer executable program to be executed by a computer of a managing apparatus, which is included in a management system in which the managing apparatus and a managed apparatus are communicatively coupled to each other through a communication network, and a communication mode between the managing apparatus and the managed apparatus can be set at either a bilateral communication mode, in which the managing apparatus and the managed apparatus can bilaterally communicate with each other through the communication network, or a unilateral communication mode, in which only the managed apparatus can unilaterally communicate with the managing apparatus through the communication network, while in an initial communication state, the communication mode is set at the bilateral communication mode, the program being executable by a computer to cause the computer to perform a process comprising: determining that the communication mode is changed from the bilateral communication mode to the unilateral communication mode, when it is impossible for the managing apparatus to transmit a request to the managed apparatus, or when it is impossible for the managing apparatus to receive a response to the request, sent from the managed apparatus, to suspend an operation for transmitting the request; and then, determining that the communication mode is changed from the unilateral communication mode to the bilateral communication mode, when it becomes possible to receive the response to the request, to resume the operation for transmitting the request.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
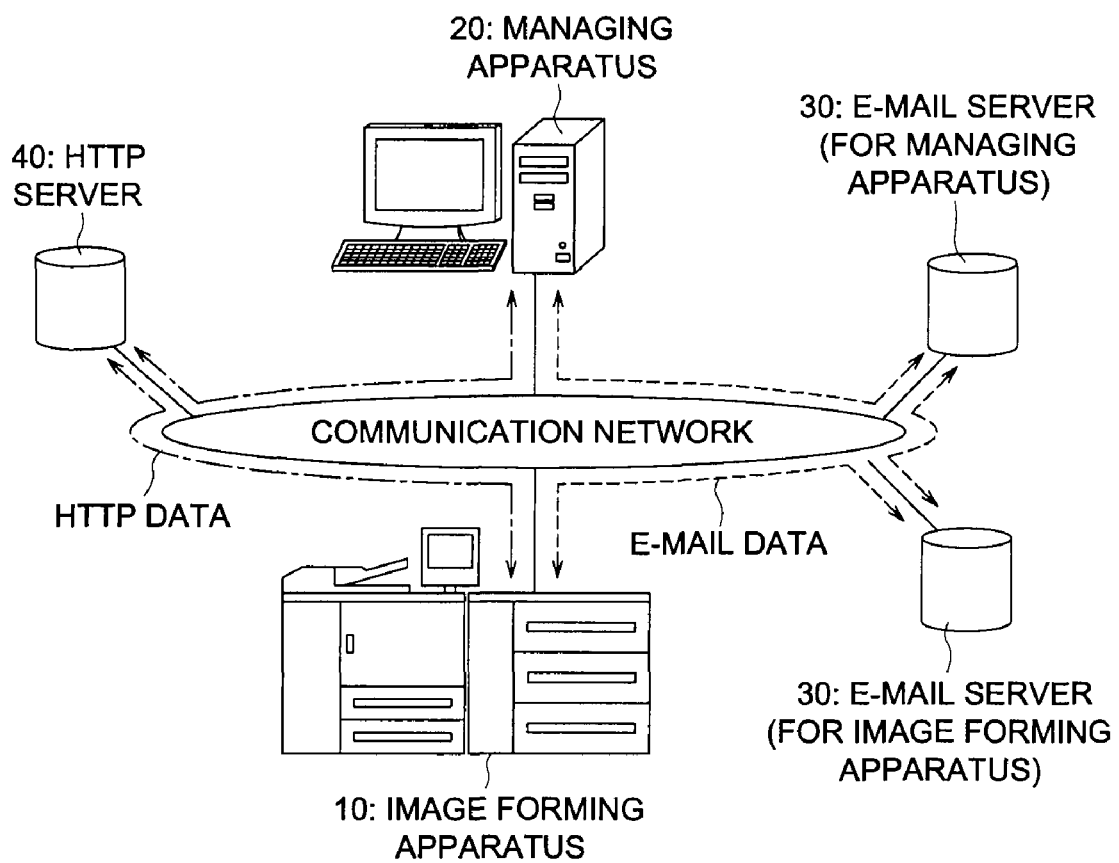
FIG. 1 shows a schematic diagram indicating a configuration of a management system embodied in the present invention.

As discussed in the "BACKGROUND OF THE INVENTION", in the management system in which the managing apparatus (host) and the managed apparatus (device) are communicated with each other by employing the E-mail method or the HTTP method, the bilateral communication in which the host transmits a request to the device and the device sends the response for the request back to the host is normally conducted. However, when the network environment has changed, sometimes, the bilateral communication should be changed to the unilateral communication from the device to the host.

However, in order to change the communication mode between the bilateral mode and the unilateral mode, it is necessary to change the settings of the network parameters. Since the abovementioned network parameters are changed associating with the change of the security policy, etc., it has been necessary to change the communication mode manually. Owing to such the manually changing operation, there has been such a problem that it is impossible for the device to transmit necessary information to the host during the time until the manual operation for changing the communication mode is completed, resulting in an inability of the host for controlling the device.

To overcome the abovementioned problem, according to the present invention, in the management system, the initial communication mode of which is set at bilateral communication mode, the managed apparatus (device) monitors a request sent from the managing apparatus (host). Then, when the managed apparatus (device) cannot receive the request sent from the managing apparatus (host), the managed apparatus (device) determines that a certain abnormality has occurred in the network between the host and the device, and changes the bilateral communication mode to the unilateral communication mode from the device to the host, so as to periodically notify the host of the current status of the device.

Further, when it is impossible for the managing apparatus (host) to transmit a request to the managed apparatus (device), or when it is impossible for the managing apparatus (host) to receive a response for the request from the managed apparatus (device), the managing apparatus (host) determines that the bilateral communication mode is changed to the unilateral communication mode and suspends the operation for transmitting the request to the device. After that, when the managing apparatus (host) can receive the response for the request, the managing apparatus (host) determines that the communication mode is changed to the bilateral communication mode, and resumes the operation for transmitting the request.

Still further, in case that it is impossible to implement the unilateral communication even in a certain communication method, the managed apparatus (device) tries to employ another communication method so as to establish the communication between the host and the device, and if determining that the communication becomes possible, the managed apparatus (device) transmits setup data, being necessary for establishing the communication between the host and the device in the above-employed communication method, to the managing apparatus (host).

By conducting the abovementioned control operations, even when a certain abnormality (malfunction) occurs after the initial communication is established, it becomes possible for the host to collect information being necessary for controlling the device, and as a result, it becomes possible to operate the management system in the normal state.

<Embodiment>

Figure 2:
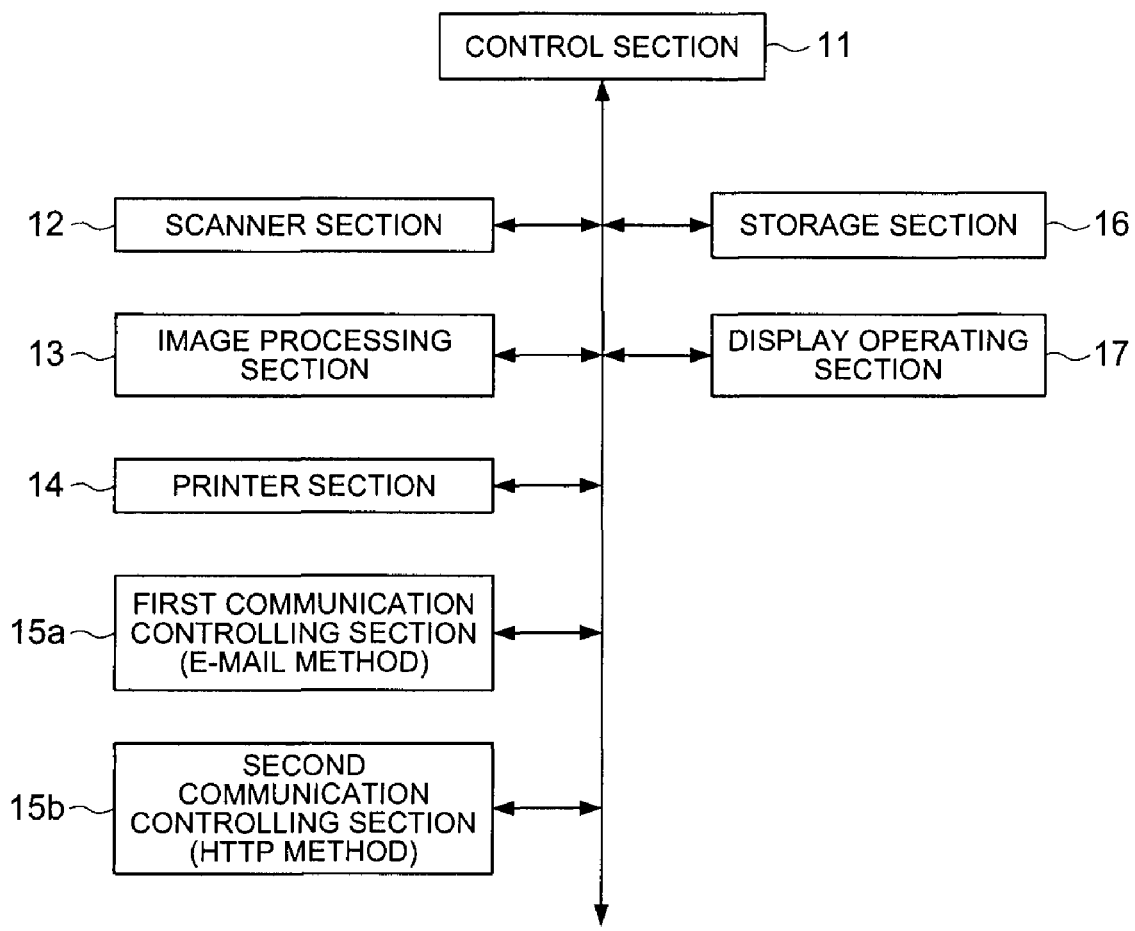
FIG. 2 shows a block diagram indicating a configuration of an image forming apparatus embodied in the present invention.
Figure 3:
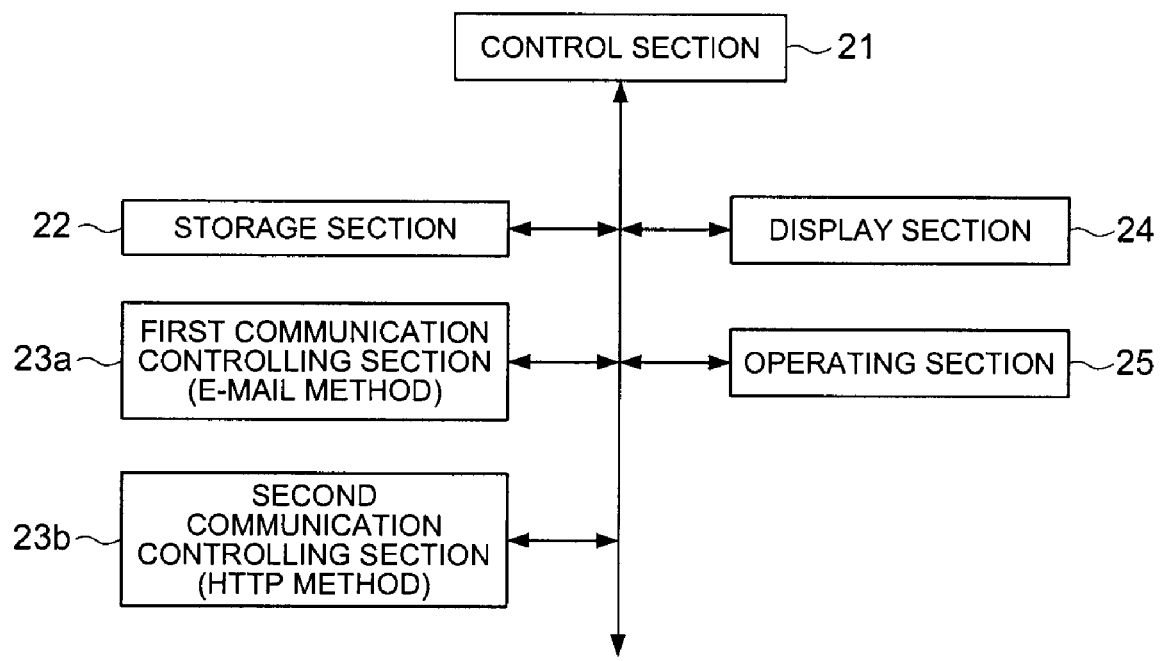
FIG. 3 shows a block diagram indicating a configuration of the managing apparatus embodied in the present invention.

In order to describe the preferred embodiment of the present invention in detail, referring to FIG. 1 through FIG. 9, a management system, a managing method and a control program, embodied in the present invention, will be detailed in the following. FIG. 1 shows a schematic diagram indicating a configuration of the management system embodied in the present invention, FIG. 2 shows a block diagram indicating a configuration of the image forming apparatus embodied in the present invention, and FIG. 3 shows a block diagram indicating a configuration of the managing apparatus embodied in the present invention. Further, FIG. 4 through FIG. 9 show flowcharts indicating controlling procedures to be implemented in the management system embodied in the present invention.

As shown in FIG. 1, the management system embodied in the present invention is constituted by a single or a plurality of image forming apparatus(es) 10, each serving as a managed apparatus, and a single or a plurality of managing apparatus(es) 20 for controlling the single or the plurality of image forming apparatus(es) 10, which are coupled to each other through a communication network, such as a LAN (Local Area Network), a WAN (Wide Area Network), etc. Further, a SMTP (Simple Mail Transfer Protocol) server and an E-mail server, such as a POP server, an IMAP (Internet Message Access Protocol) server, etc., and an HTTP server 40, such as a Web-DAV server, etc., are coupled to the communication network.

In this connection, although the schematic diagram shown in FIG. 1 indicates a configuration of the management system in which the communication can be implemented in two communication methods including the E-mail method and the HTTP method, it is applicable that the communication can be established by employing at least one of plural communication methods, in which the bilateral communication and the unilateral communication are changeable to each other. Further, the scope of the communication method is not limited to the E-mail method or the HTTP method. For instance, other than the E-mail method and the HTTP method, a plurality of communication methods selected from various kinds of communication methods, such as a method employing a telephone line, a method employing an HTTPS (Hypertext Transfer Protocol Security) being a protocol created by attaching a data encrypting function, which complies with the SSL (Secure Socket Layer), to the HTTP, a method employing the FTP (File Transfer Protocol) being a protocol to be used at the time when transferring a file through the TCP/IP (Transmission Control Protocol/Internet Protocol) network, etc., are also applicable in the present invention, as well. The concrete configuration of each of the abovementioned apparatuses will be detailed in the following.

<Image Forming Apparatus>

Further, as shown in FIG. 2, the image forming apparatus 10 is provided with a control section 11, a scanner section 12, an image processing section 13, a printer section 14, a first communication controlling section 15a, a second communication controlling section 15b, a storage section 16, a display operating section 17, etc.

The control section 11 is constituted by a CPU (Central Processing Unit), a ROM (Read Only Memory), a RAM (Random Access Memory), etc. In response to operating actions conducted on the display operating section 17, the CPU reads out various kinds of programs stored in the ROM and develops them into the RAM, so as to control each of the sections provided in the image forming apparatus 10 according to the programs developed on the RAM, and at the same time, controls the statuses of each of the sections.

Further, the control section 11 monitors the request to be sent from the managing apparatus 20. When receiving no request from the managing apparatus 20 within a predetermined time period, the control section 11 determines that a certain abnormality (malfunction) has occurred in any one of the communication network, the E-mail server 30 and the HTTP server 40, and changes the bilateral communication mode, currently implemented, to the unilateral communication mode so as to unilaterally transmit data from the image forming apparatus 10. When receiving the request sent from the managing apparatus 20 after the bilateral communication mode has changed to the unilateral communication mode, the control section 11 determines that the certain abnormality (malfunction) has been eliminated in any one of the communication network, the E-mail server 30 and the HTTP server 40, and changes the unilateral communication mode, currently implemented, to the bilateral communication mode so as to implement the operation for transmitting a response to the request. In this connection, it is applicable that the abovementioned controlling operations are implemented as functions of hardware, or alternatively, are configured as a control program, which makes a computer serve as the control section 11 to implement the abovementioned controlling operations by executing the concerned program in the control section 11.

The scanner section 12 is constituted by a light source to emit a light beam that is scanned on a document, a CCD (Charge Coupled Device) to convert the light beam reflected from the surface of the document to electric signals and an analogue to digital converter to convert the electric signals to the digital image data, so as to read the information recorded on the document.

The image processing section 13 applies various kinds of image processing operations, such as an image size expansion or compression processing, a rotation processing, a color conversion processing form RGB data to YMCK data, a gradation correction processing, to the digital image data generated by the scanner section 12 (hereinafter, referred to as scanned image data).

The printer section 14 is provided with: an image forming section to form a toner image to be transferred onto a transfer material; a transferring section to transfer the toner image formed by the image forming section onto the transfer material; a fixing section to fix the toner image, transferred by the transferring section, onto the transfer material; a conveyance section to convey the transfer material; cleaning sections to clean the image forming section, the transferring section and the fixing section, respectively; etc., so as to form a reproduced image based on the inputted image data onto the transfer material through the electro-photographic process, and outputs the transfer material on which the reproduced image is formed. In addition to the above, the printer section 14 is further provided with a counter to count a number of printed transfer materials for every size of the transfer material, so as to transmit the control information, such as a total number of printed sheets, a number of printed sheets for every size, etc., to the control section 11.

The first communication controlling section 15a conducts controlling operations for transmitting an E-mail to the mail server 30 (SMTP server) being an external apparatus, and for receiving an E-mail sent from the mail server 30 (POP server). Further, the first communication controlling section 15a also serves as a mailing manager that conducts direction processing of the transmitted E-mails and the received E-mails.

The second communication controlling section 15b conducts controlling operations for writing data into the HTTP server 40 (Web-DAV server) being an external apparatus, and for reading data from the HTTP server 40 (Web-DAV server). Namely, the second communication controlling section 15b serves as an HTTP client terminal device.

The storage section 16 is constituted by a flash memory, an HDD (Hard Disc Drive), etc., so as to store various kinds of data, setting conditions, etc., therein. Specifically in this first embodiment, the storage section 16 stores such data that represents the control information, such as a total number of printed paper sheets, a number of printed paper sheets for every size, a usage frequency of the apparatus as a whole, usage frequencies of parts employed in the apparatus, a maintenance history, a parts changing history, etc., therein.

The display operating section 17 is formed by mounting a pressure-sensitive operating section (touch panel), in which transparent electrodes are aligned in a lattice pattern, onto a display section, such as a LCD (Liquid Crystal Display), an Organic Electroluminescence Display, etc., so as to make it possible to detect X-Y coordinates of a power point depressed by a finger, a touch pen, etc., as voltage values. The detected positional signals are to be outputted to the control section 11 as operational signals.

<Managing Apparatus>

Further, as shown in FIG. 3, the managing apparatus 20 is provided with a control section 21, a storage section 22, a first communication controlling section 23a, a second communication controlling section 23b, a display section 24, an operating section 25, etc.

The control section 21 is constituted by a CPU, a ROM, a RAM, etc. In response to operating actions conducted on the operating section 25, the CPU reads out various kinds of programs stored in the ROM and develops them into the RAM, so as to control each of the sections provided in the managing apparatus 20, according to the programs developed on the RAM, and at the same time, controls the statuses of the image forming apparatus 10.

Further, when it is impossible to receive the response to the request from the image forming apparatus 10 or impossible to transmit the request to the image forming apparatus 10, the control section 21 determines that the communication mode of the image forming apparatus 10 has been changed to the unilateral communication mode from the bilateral communication mode, and based on the above-determination, suspends the operation for transmitting the request. Then, when it becomes possible to receive the response to the request after the communication mode of the image forming apparatus 10 had been changed to the unilateral communication mode, the control section 21 determines that the communication mode of the image forming apparatus 10 has been changed to the bilateral communication mode from the unilateral communication mode, and based on the above-determination, conducts the controlling operation for resuming the operation for transmitting the request. In this connection, it is applicable that the above-mentioned controlling operations are implemented as functions of hardware, or alternatively, are configured as a control program, which makes a computer serve as the control section 11 to implement the abovementioned controlling operations by executing the concerned program in the control section 21.

The storage section 22 is constituted by a flash memory, an HDD (Hard Disc Drive), etc., so as to store various kinds of data. Specifically in this first embodiment, the storage section 22 stores such control information that includes information acquired from each of the image forming apparatuses 10 as the response to the request (for instance, individual counter information, a firmware rewriting event), and other information notified in the unilateral communication mode from the image forming apparatuses 10 (for instance, an overall counter information, JAM information, a number of service calls, tray information), etc., therein.

The first communication controlling section 23a conducts controlling operations for transmitting an E-mail to the mail server 30 (SMTP server) being an external apparatus, and for receiving an E-mail sent from the mail server 30 (POP server). Further, the first communication controlling section 23a also serves as a mailing manager that conducts direction processing of the transmitted E-mails and the received E-mails.

The second communication controlling section 23b conducts controlling operations for writing data into the HTTP server 40 (Web-DAV server) being an external apparatus, and for reading data from the HTTP server 40 (Web-DAV server). Namely, the second communication controlling section 23b serves as an HTTP client terminal device.

The display section 24 is constituted by a LCD (Liquid Crystal Display), an Organic ELD (Electroluminescence Display), etc., so as to display various kinds of controlling screens, etc., based on display signals sent from the control section 21. Further, the operating section 25 is constituted by a keyboard, a mouse, etc., so as to conduct operations for selecting the communication method to be applied to each of the image forming apparatuses, etc.

In this connection, the configurations shown in FIG. 2 and FIG. 3 are merely examples of various variations. Accordingly, it is possible to change the configurations of them as needed, as far as both the managing apparatus 20 and the image forming apparatuses 10 are capable of communicating with each other in both the bilateral communication mode and the unilateral communication mode.

Next, each of the operations, including an initial communication, a normal communication, a recovering operation and an operation for switching the communication mode, which are to be conducted in the controlling system having the abovementioned configuration, will be detailed in the following in order of the above. Although the E-mail method is premised in the foregoing explanations, the same concept is applicable for the HTTP method or another communication method as well.

<Initial Communication>

In the initial communication, when the image forming apparatuses 10 succeeds in receiving a response E-mail sent from the managing apparatus 20, which corresponds to the setup E-mail for establishing the communication between them, the image forming apparatuses 10 completes the operation for setting the bilateral communication mode, while when the image forming apparatuses 10 fails to receive the response E-mail, the image forming apparatuses 10 change the communication mode to the unilateral communication mode from the bilateral communication mode. In this connection, during the normal communicating operation, communication failures, which could be regarded as a server malfunction or a network defect, such as a connection error, no incoming E-mail, etc., are set as objects for switching the communication mode. However, since an inputting error of the parameters is liable to occur in the initial communicating operation, all of the errors are confirmed in a dialogue interaction mode before changing the communication mode.

Figure 4:
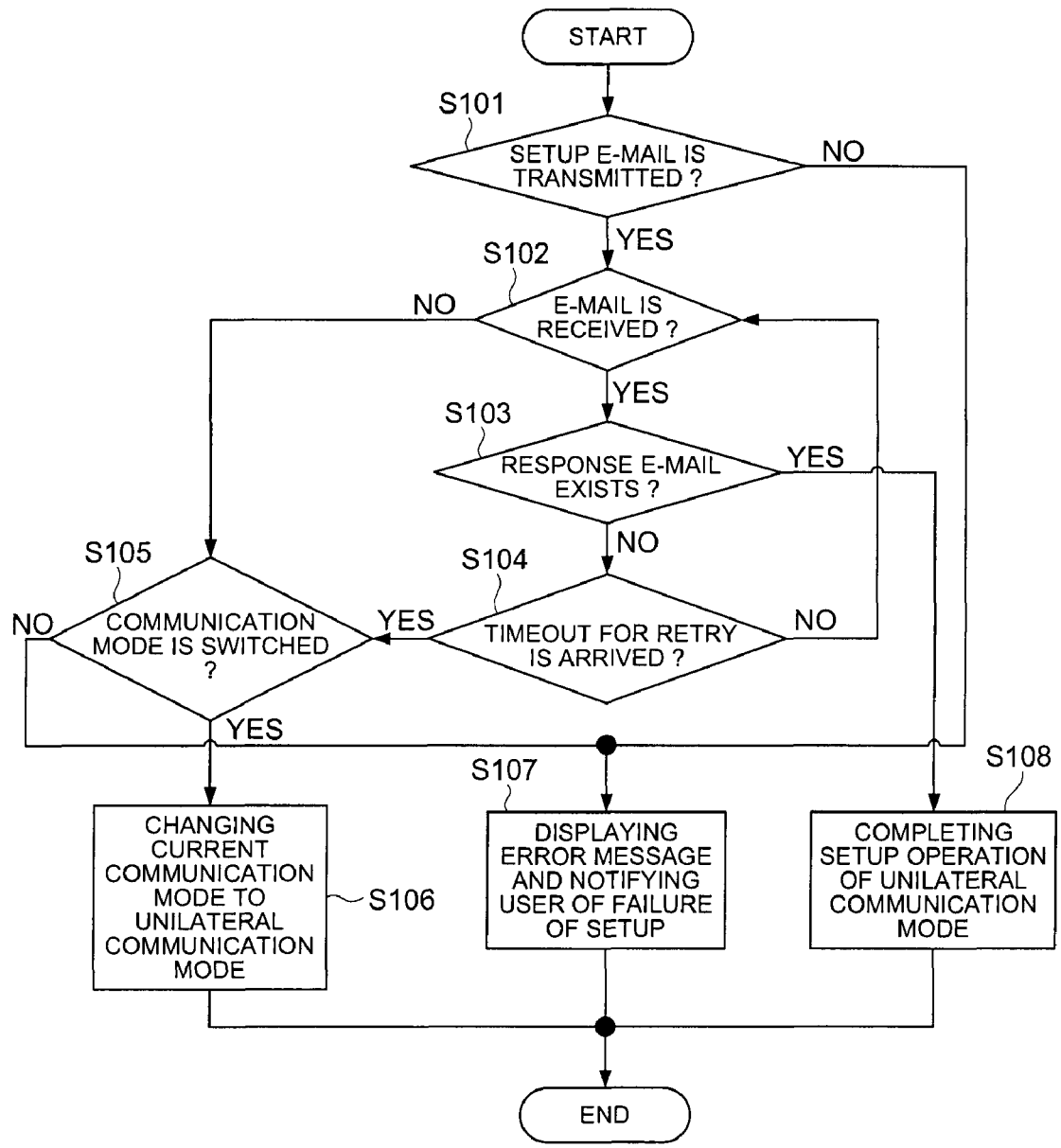
FIG. 4 shows a flowchart indicating operations (operations at an initial communication time) to be implemented in an image forming apparatus embodied in the present invention.

Referring to the flowchart shown in FIG. 4, the operational sequence of the image forming apparatuses 10 at the time of initial communicating operation will be detailed in the following.

In Step S101, the control section 11 of the image forming apparatuses 10 creates a setup E-mail established in advance to transmit it to the managing apparatus 20 by using the first communication controlling section 15a. When failing to transmit the setup E-mail, the control section 11 makes the display operating section 17 display an error message so as to notify the user of the failure of the setup operation in Step S101. On the other hand, when succeeding in transmitting the setup E-mail, the control section 11 proceeds to the processing in Step S102.

In Step S102, the control section 11 conducts an E-mail receiving operation. When succeeding in communicating with the POP server (including such a case that no E-mail has been received), the control section 11 proceeds to the processing in Step S103. On the other hand, when an error (such as a connection error, an authentication error) occurs in the communication system, the control section 11 proceeds to the processing in Step S105.

In Step S103, the control section 11 confirms whether or not the response E-mail sent from the managing apparatus 20 exists. When confirming that the response E-mail concerned exists, the control section 11 completes the setup operation to be conducted in Step S108. On the other hand, when confirming that the response E-mail concerned does not exist, the control section 11 repeats the E-mail receiving operation in Step S104 until to timeout.

When a communication system error has occurred in the E-mail receiving operation in Step S105 and the timeout has arrived in Step S104, only for the initial communication, the control section 11 notifies the user of the fact that the setup operation of the bilateral communication mode is failed, and asks the user whether or not the current communication mode should be switched to the unilateral communication mode. When the user allows switching the current communication mode to the unilateral communication mode, the control section 11 changes the current communication mode to the unilateral communication mode in Step S106. On the other hand, when the user refuses to switch the current communication mode to the unilateral communication mode, the control section 11 makes the display operating section 17 display an error message thereon in Step S107, so as to notify the user of failure of the setup operation.

On the other hand, when receiving the setup E-mail sent from the image forming apparatuses 10, the control section 21, provided in the managing apparatus 20, creates a response E-mail and employs first communication controlling section 23a to transmit it to the image forming apparatuses 10.

<Normal Communication>

In the normal communication, when the receiving operation becomes impossible due to a change of the security policy or a server malfunction, the control section 11 changes the current communication mode to the unilateral communication mode. In this connection, although the managing apparatus 20 transmits an instruction for triggering the data transmitting operation and its contents in the bilateral communication mode, it is impossible for the image forming apparatuses 10 to acquire such the information from the managing apparatus 20 in the unilateral communication mode. Accordingly, the information in regard to a data transmitting period (every 30 minutes, every 1 hour, every six hours, etc.), a data transmitting timing (at the time of job completion, at the time of service call, at the time of JAM occurrence, at the time of turning OFF the power source, etc.), transmitting contents (counter, status, etc.), a presence or absence of data encryption, etc., are established in advance in the image forming apparatuses 10 side. Further, in order to confirm whether or not the POP server has already recovered, the control section 11 implements a receiving test at the time of exchanging data between them. As a result of the receiving test, the control section 11 confirms that the POP server has already recovered, the control section 11 resumes the bilateral communication mode. This automatic switching operation is also applicable for the managing apparatus 20.

Figure 5:
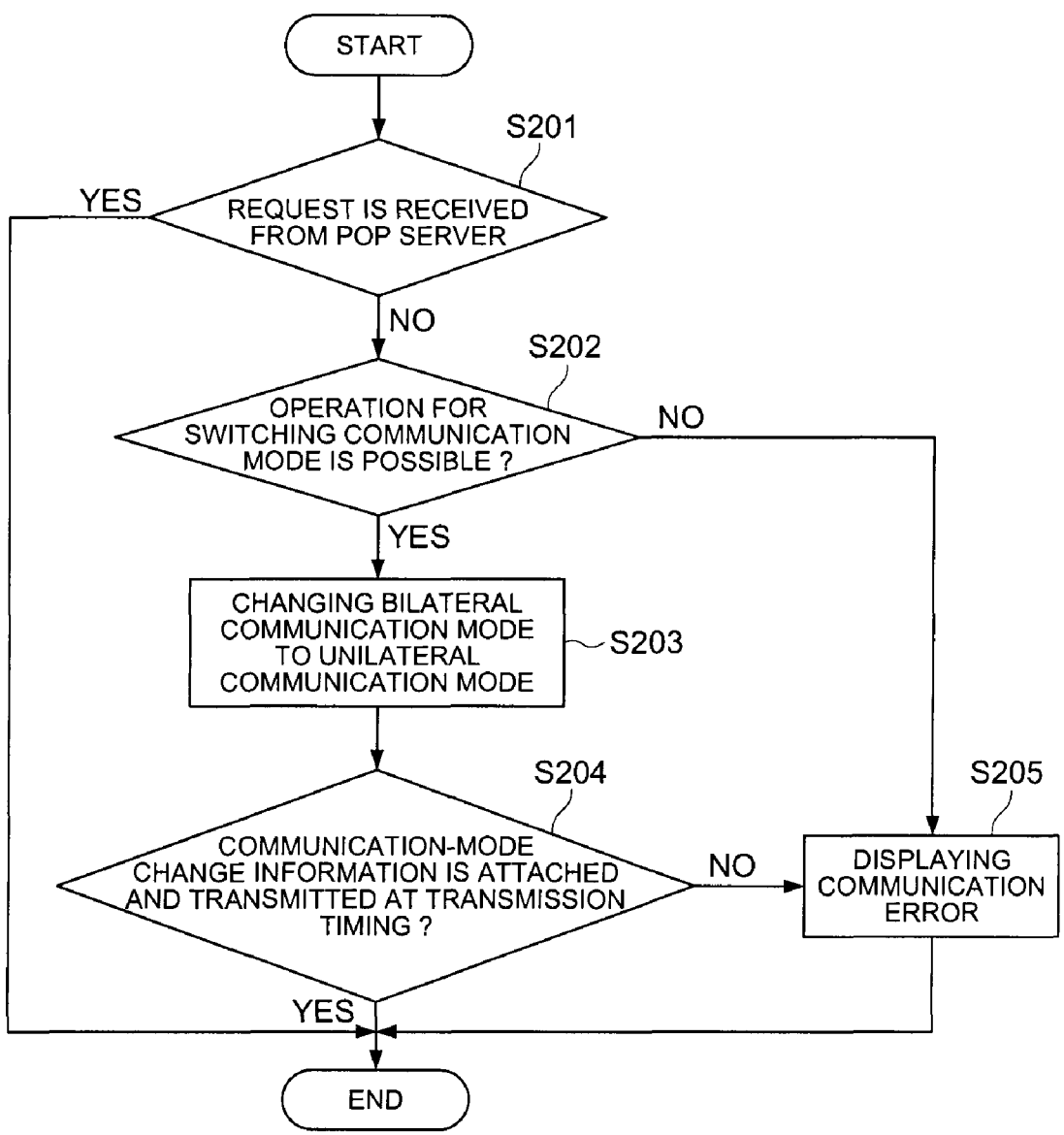
FIG. 5 shows a flowchart indicating operations (operations for changing a current communication mode from a bilateral communication mode to a unilateral communication mode at a normal communication time) to be implemented in an image forming apparatus embodied in the present invention.

Referring to the flowchart shown in FIG. 5, the operational sequence of the image forming apparatuses 10 at the time when changing the bilateral communication mode to unilateral communication mode will be detailed in the following.

In Step S201, the control section 11 communicates with the POP server to receive a request sent from the managing apparatus 20. When succeeding in receiving the request, the control section 11 determines that the bilateral communication mode is normally performed at present, and finalizes the processing without switching the communication mode. On the other hand, when failing to receive the request, the control section 11 proceeds to the processing in Step S202.

In Step S202, the control section 11 determines whether or not the operation for switching the communication mode from the bilateral communication mode to the unilateral communication mode is possible. For instance, in case of the connection error (error occurred between the POP server and the image forming apparatuses 10), since it is possible to conduct the data transmitting operation from the image forming apparatuses 10, the control section 11 determines that the switching operation concerned is possible, and proceeds to the processing in Step S203. On the other hand, in case of the authentication error, since it is impossible to conduct the data transmitting operation from the image forming apparatuses 10 as well, the control section 11 determines that the switching operation concerned is impossible, and, in Step S205, makes the display operating section 17 display a communication error thereon and finalizes the processing without switching the communication mode.

In Step S203, the control section 11 changes the communication mode from the bilateral communication mode to the unilateral communication mode. Concretely speaking, without responding to the request sent from the managing apparatus 20, the control section 11 conducts the operation for changing the internal operating mode of the image forming apparatuses 10, so as to make it possible to periodically transmit information, representing predetermined contents, at a predetermined timing for transmitting the data concerned.

In Step S204, the control section 11 attaches communication-mode change information, for notifying the user of the fact that the communication mode has changed to the unilateral communication mode, to the transmitting data, so as to transmit the transmitting data attached with the communication-mode change information to the managing apparatus 20 at the transmission timing established in the unilateral communication mode. When succeeding in transmitting the data concerned, since the unilateral communication mode is possible, the control section 11 finalizes the processing. On the other hand, when failing to transmit the data concerned, since the unilateral communication mode is impossible as well, the control section 11 makes the display operating section 17 display the communication error thereon in Step S205 and finalizes the processing (END).

On the other hand, based on the communication-mode change information attached to the data transmitted from the image forming apparatuses 10, the control section 21 of the managing apparatus 20 determines whether the current communication mode is the bilateral communication mode or the unilateral communication mode. When determining that the current communication mode is the unilateral communication mode, the control section 21 suspends the processing to be conducted in the following.

Figure 6:
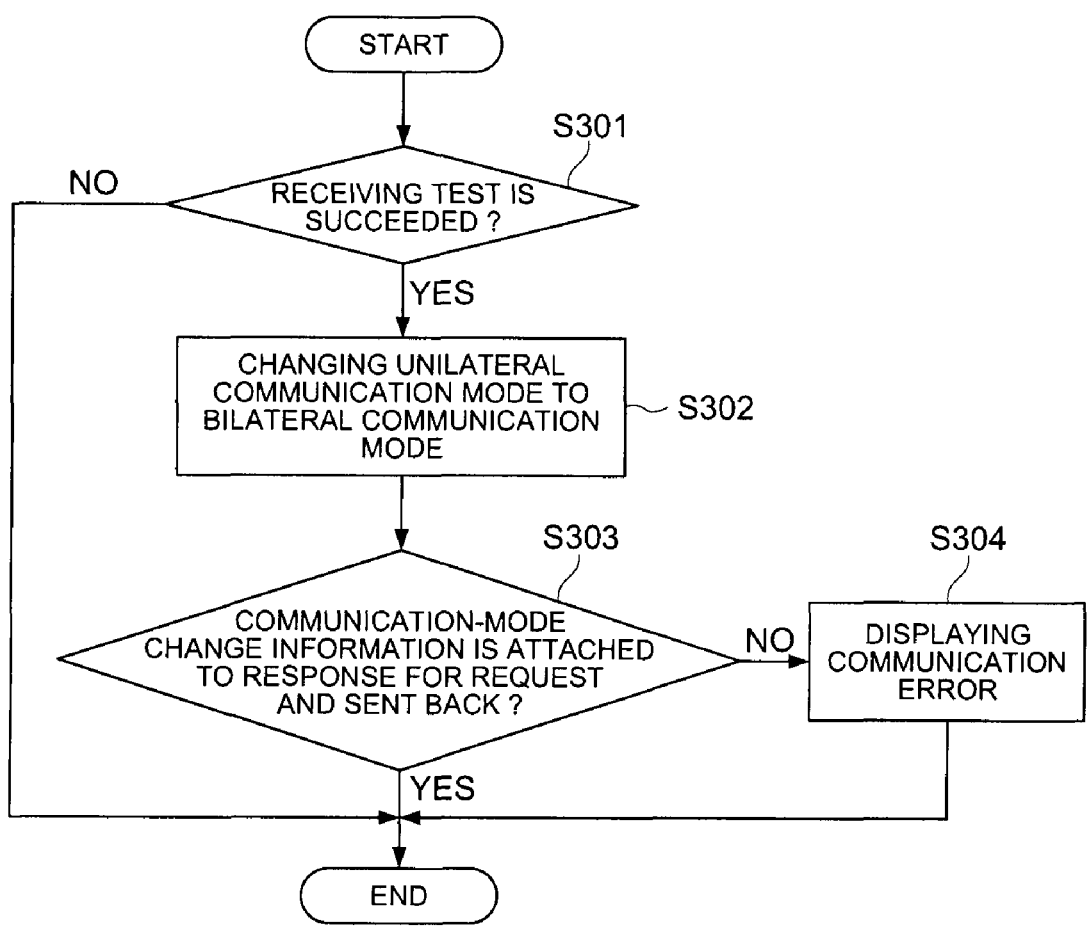
FIG. 6 shows a flowchart indicating operations (operations for changing a current communication mode from a unilateral communication mode to a bilateral communication mode at a normal communication time) to be implemented in an image forming apparatus embodied in the present invention.

Next, referring to the flowchart shown in FIG. 6, the operational sequence of the image forming apparatuses 10 at the time when changing the unilateral communication mode to bilateral communication mode will be detailed in the following.

In Step S301, in order to confirm whether or not the POP server is recovered, the control section 11 of the image forming apparatuses 10 conducts a receiving test at a predetermined timing (for instance, a data transmitting timing in the unilateral communication mode). When succeeding in the receiving test, the control section 11 proceeds to the processing in Step S302. On the other hand, when failing in the receiving test, since it is impossible to resume the bilateral communication, the control section 11 finalizes the processing without conducting the communication-mode change operation.

In Step S302, determining that the POP server is recovered, the control section 11 changes the communication mode from the unilateral communication mode to the bilateral communication mode. Concretely speaking, the control section 11 conducts the operation for changing the internal operating mode of the image forming apparatuses 10, so as to make it possible to transmit a response to the request received from the managing apparatus 20.

In Step S303, the control section 11 attaches communication-mode change information, for notifying the user of the fact that the communication mode has changed to the bilateral communication mode, to the response for the request, so as to transmit the response attached with the communication-mode change information to the managing apparatus 20. When succeeding in transmitting the response concerned, since the bilateral communication mode is possible, the control section 11 finalizes the processing (END). On the other hand, when failing to transmit the response concerned, the control section 11 makes the display operating section 17 display the communication error thereon in Step S304 and finalizes the processing (END).

On the other hand, based on the communication-mode change information attached to the data transmitted from the image forming apparatuses 10, the control section 21 of the managing apparatus 20 determines whether the current communication mode is the bilateral communication mode or the unilateral communication mode. When determining that the current communication mode is changed to the bilateral communication mode, the control section 21 resumes the operation for transmitting the request, which has been temporarily suspended.

<Recovery of Host>

When the communication error has not occurred at a position located between the E-mail server 30 and the image forming apparatuses 10, but has occurred at another position located between the managing apparatus 20 and the E-mail server 30, the managing apparatus 20 only copes with the receiving operation. Receiving the response sent from the image forming apparatuses 10, the managing apparatus 20 abolishes the bilateral communication sequence which makes the event being completed, and changes its communication mode to a unilateral communication mode of the managing apparatus version, in which the managing apparatus 20 only accepts regular period transmissions and an emergency communication sent from the image forming apparatuses 10. On the other hand, when receiving no request from the managing apparatus 20 even if a fixed time period (for instance, one day) has elapsed, the image forming apparatuses 10 automatically changes its communication mode to the unilateral communication mode so as to conduct the regular period transmissions without waiting the request.

Figure 7:
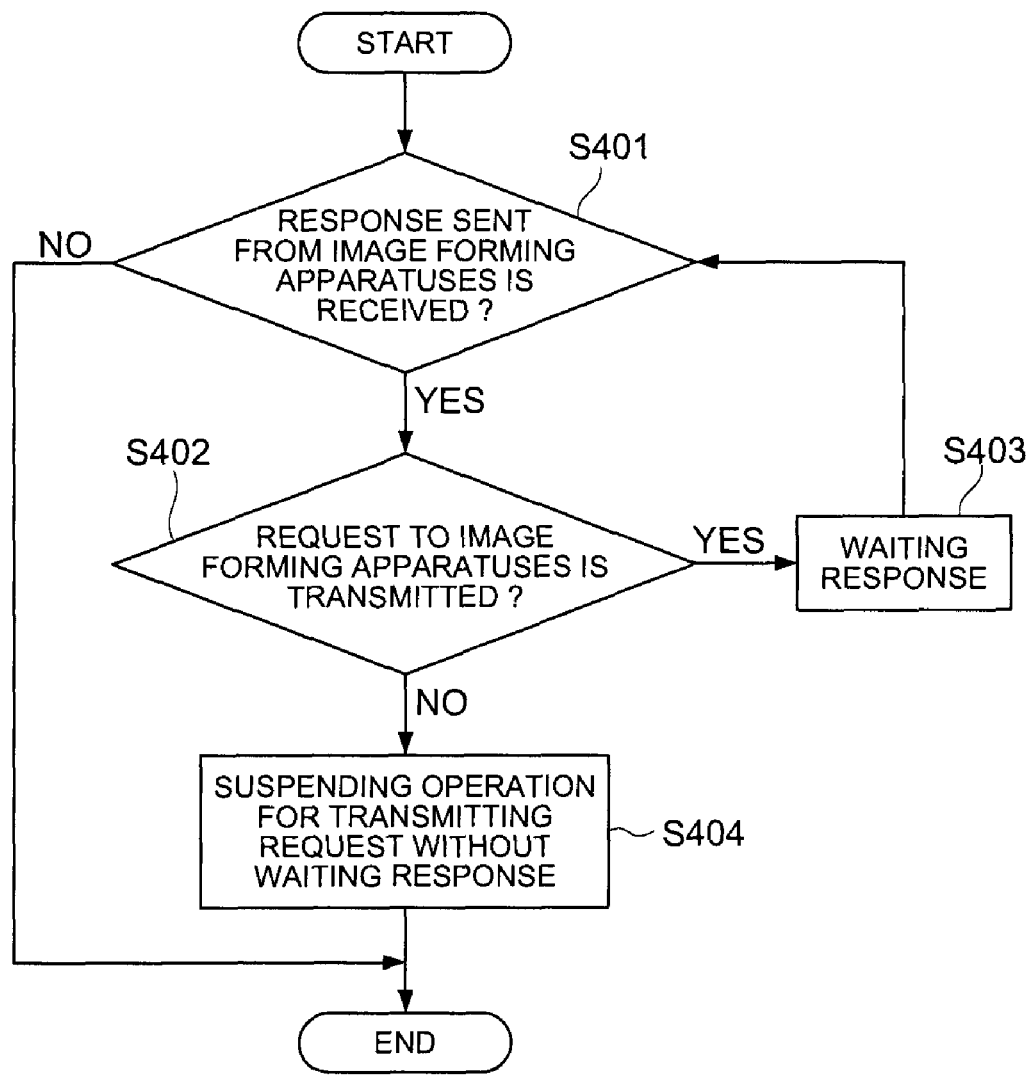
FIG. 7 shows a flowchart indicating recovery operations to be implemented in the managing apparatus embodied in the present invention.

Next, referring to the flowchart shown in FIG. 7, the operational sequence of the managing apparatus 20 will be detailed in the following.

In Step S401, the control section 21 of the managing apparatus 20 monitors the response to be sent from the image forming apparatuses 10. When receiving the response, the control section 21 creates a next request based on the contents of the response received, and proceeds to the processing in Step S402. On the other hand, when being unable to receive the response, since it is impossible to control the image forming apparatuses 10, the control section 21 finalizes the processing.

In Step S402, the control section 21 transmits the created request to the image forming apparatuses 10. When succeeding in transmitting the request concerned, the control section 21 waits a response to the request concerned in Step S403, and receives the response in Step S401. On the other hand, when failing to transmit the concerned request, the control section 21 proceeds to the processing in Step S404.

In Step S404, the control section 21 suspends the operation for transmitting the request, and changes the operating mode so as to process the regular period transmissions only, without waiting the response to the request concerned.

Figure 8:
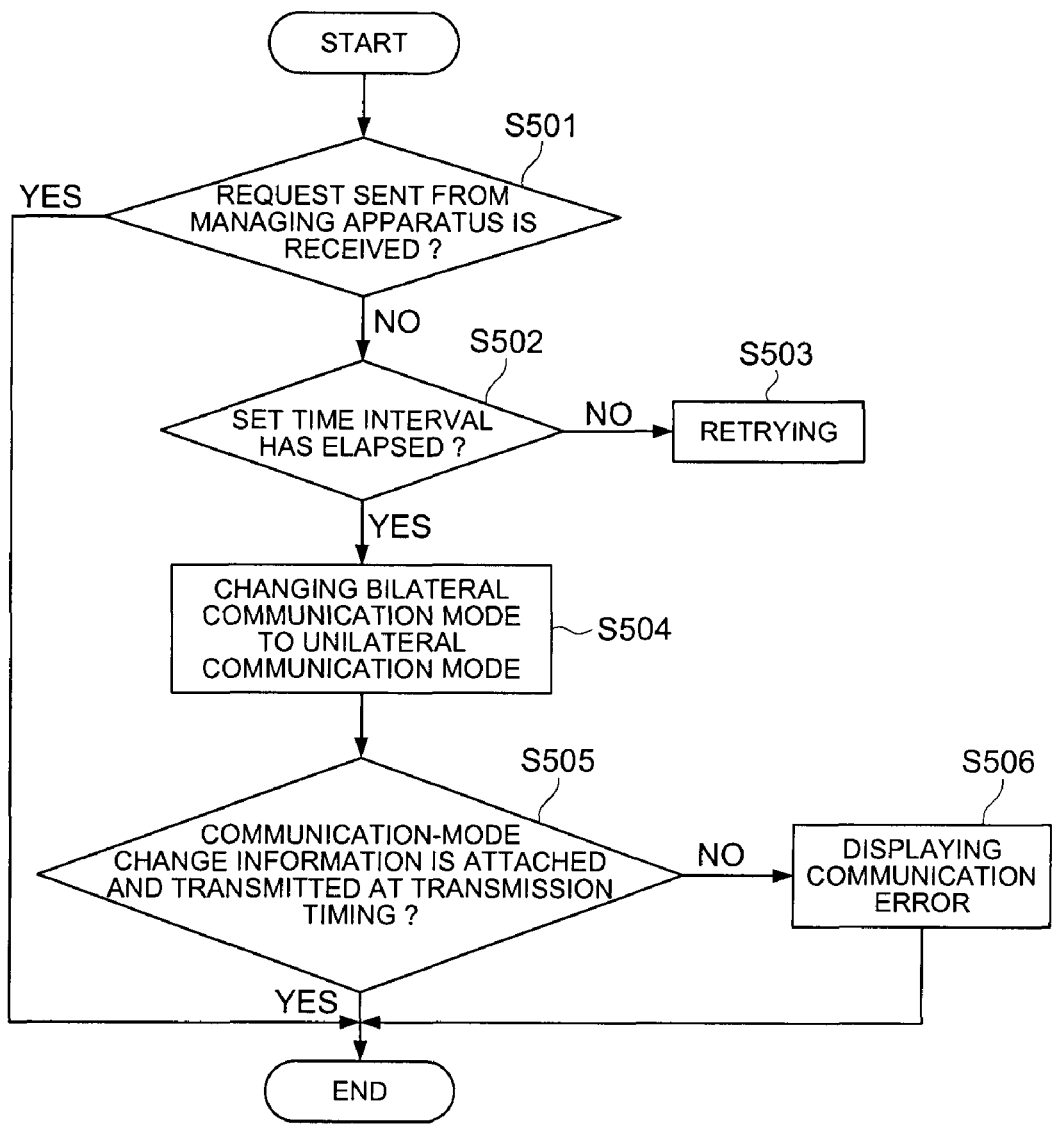
FIG. 8 shows a flowchart indicating recovery operations to be implemented in the image forming apparatus embodied in the present invention.

Next, referring to the flowchart shown in FIG. 8, the operational sequence of the image forming apparatuses 10 will be detailed in the following.

In Step S501, the control section 11 of the image forming apparatuses 10 monitors the request to be sent from the managing apparatus 20. When receiving the request, since the bilateral communication mode is normally implemented, the control section 11 finalizes the processing. On the other hand, when being unable to receive the request, the control section 11 conducts retrying operations in Step S502 until a set time interval has elapsed. Then, in case that no request has received or in case that no request E-mail exist on the POP server, even when the set time interval has elapsed, the control section 11 determines that the timeout has come, and proceeds to the processing in Step S504.

In Step S504, the control section 11 changes its communication mode from the bilateral communication mode to the unilateral communication mode.

In Step S505, the control section 11 attaches communication-mode change information, for notifying the user of the fact that the communication mode has changed to the unilateral communication mode, to the transmitting data, so as to transmit the transmitting data attached with the communication-mode change information to the managing apparatus 20 at the transmission timing established in the unilateral communication mode. When succeeding in transmitting the data concerned, since the unilateral communication mode is possible, the control section 11 finalizes the processing. On the other hand, when failing to transmit the data concerned, since the unilateral communication mode is impossible as well, the control section 11 makes the display operating section 17 display the communication error thereon in Step S506 and finalizes the processing (END).

<Automatic Change of Communication Method>

Since it is impossible for the host and the device to communicate with each other even by employing the unilateral communication mode when a communication error has occurred, the current communication method should be changed. For instance, if the communication error has occurred in the E-mail method, the image forming apparatuses 10 changes the current communication method from E-mail method to the other communication method (for instance, the HTTP method). On that occasion, since the managing apparatus 20 still memorizes the previous communication method, the managing apparatus 20 refuses the new communication method changed by the image forming apparatuses 10. To solve this problem, a procedure for automatically stating over again from the initial communication is introduced into the operation for changing the communication method, and after that, the image forming apparatuses 10 resends the information that could not be transmitted due to the communication error concerned.

Figure 9:
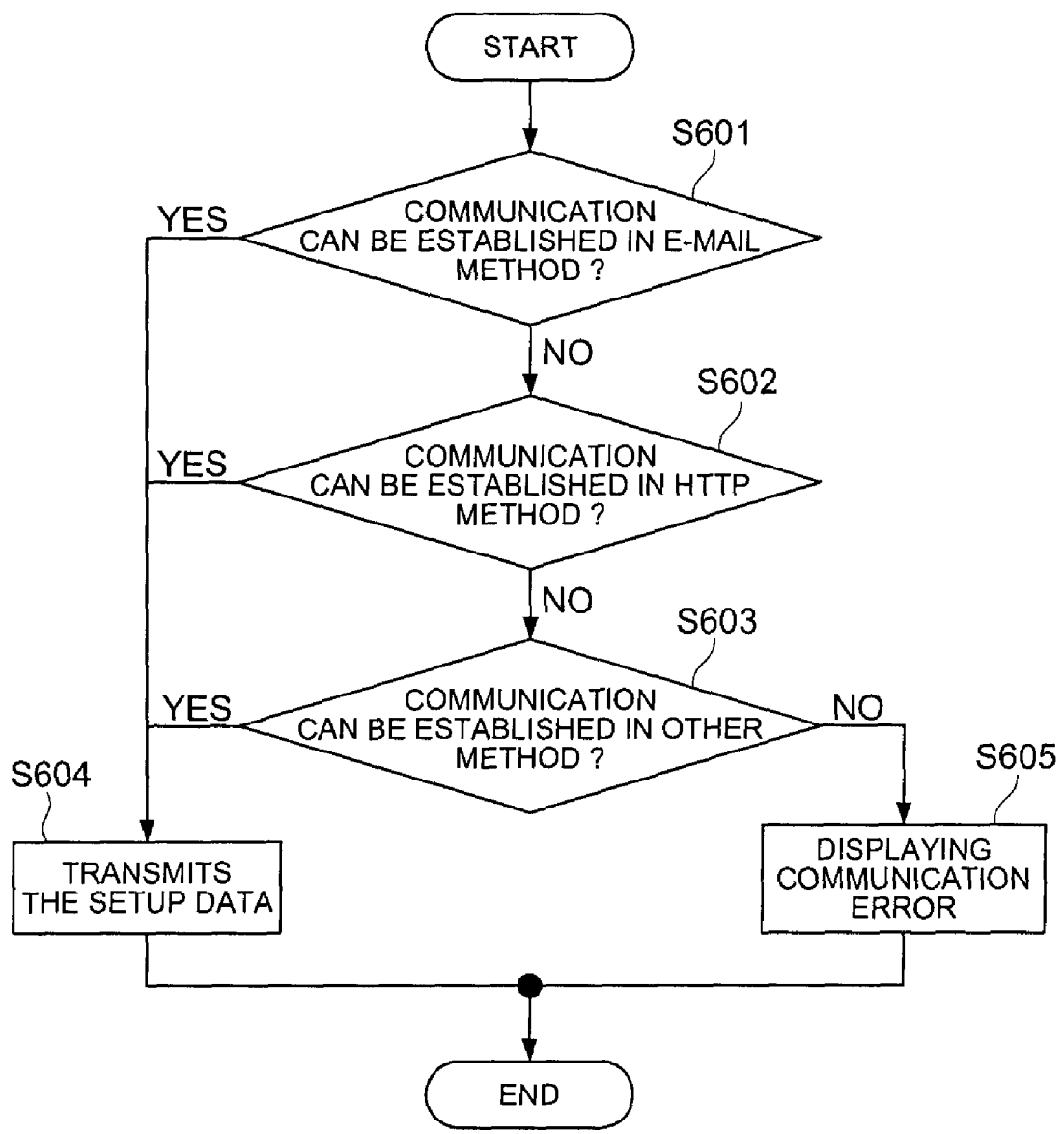
FIG. 9 shows a flowchart indicating operations (operations for switching a communication method) to be implemented in an image forming apparatus embodied in the present invention.

Next, referring to the flowchart shown in FIG. 9, the operational sequence of the image forming apparatuses 10 will be detailed in the following.

Initially, the control section 11 of the image forming apparatuses 10 tries to communicate with the managing apparatus 20 in the E-mail method (Step S601), and if failing to communicate in the E-mail method, tries to communicate in the HTTP method (Step S602), and further, if still failing to communicate in the HTTP method, tries to communicate in the other communication method, such as the telephone line method, etc., (Step S603). If it is impossible to communicate in every one of all communication methods tried, the control section 11 makes the display operating section 17 display the communication error thereon and finalizes the processing (END).

When succeeding in communicating with the managing apparatus 20 in any one of the communication methods tried, the control section 11 transmits the setup data so as to stat over again from the initial communication in Step S604.

As described in the foregoing, in the management system in which the communication mode is set at the bilateral communication mode in its initial state, the image forming apparatuses 10 conducts such the controlling operations including: changing the current communication mode to the unilateral communication mode when it is impossible to receive the request sent from the managing apparatus 20; and then, resuming the bilateral communication mode when it becomes possible to receive the request sent from the managing apparatus 20, while, the managing apparatus 20 conducts such the controlling operations including: determining that the current communication mode is changed to the unilateral communication mode when it is impossible to receive a response to the request from the image forming apparatuses 10 or when it is impossible to transmit the request to the image forming apparatuses 10, and suspending the operation for transmitting the request; and after that, determining that the communication mode is returned to the bilateral communication mode when it becomes possible to receive the response to the request from the image forming apparatuses 10, and resuming the operation for transmitting the request. According to the novel controlling operations mentioned in the above, even in such a case that a certain abnormality (malfunction) occurs in the network or the server after the initial communication has established, it becomes possible for the managing apparatus 20 to collect the information necessary for controlling the image forming apparatuses 10, and accordingly, to normally operate the management system as a whole.

In this connection, the case in which the image forming apparatuses 10 serves as the managed apparatus is exemplified as an embodiment of the present invention in the foregoing. However, the scope of the present invention is not limited to the aforementioned embodiment. The present invention may be applied to an arbitral apparatus which is controllable for the managing apparatus 20.

The present invention is available for a management system in which a managing apparatus and a managed apparatus can communicate with each other in either a bilateral communication mode or a unilateral communication mode, a managing method to be employed for the management system concerned and a control program to be executed in the managing apparatus and the managed apparatus concerned.

According to any one of the management system, the managing method and the control program, embodied in the present invention, in the management system in which the communication mode is set at the bilateral communication mode in its initial state, it becomes possible to securely maintain the communication between the managing apparatus and the managed apparatus even when a certain malfunction has occurred in the network or the server.

This is because, when it is impossible for the managed apparatus (device) to receive the request sent from the managing apparatus (host) in the bilateral communication mode currently set, the device changes the communication mode from the bilateral communication mode to the unilateral communication mode and unilaterally transmits the transmission data and then, when it becomes possible to receive the request, the device changes the communication mode from the unilateral communication mode to the bilateral communication mode so as to transmit a response to the request back to the managing apparatus.

Further, when it is impossible for the managing apparatus (host) to transmit the request to the managed apparatus (device), or when it is impossible to receive the response to the request, determining that the communication mode is changed to the unilateral communication mode, the host suspends an operation for transmitting the request, and then, when it becomes possible to receive the response to the request, determining that the communication mode is changed to the bilateral communication mode, the host resumes the operation for transmitting the request.

Still further, when it is impossible for the managed apparatus (device) to transmit the transmission data or the response to the request to the managing apparatus (host), the device employs another communication method, so as to transmit setup data, to be used for establishing a communicative connection in the other communication method, to the host.

According to the controlling operations above-mentioned, it becomes possible to prevent the management system from suffering from such a state that the host continues sending the request, or the device continues waiting the request, despite that a certain malfunction has occurred in the network or the server, and accordingly, it also becomes possible to normally operate the management system even in the above-case by speedily changing the communication mode from the bilateral communication mode to the unilateral communication mode.

Further, it becomes possible to prevent the management system from suffering from such a state that the host continues to suspend sending the request, or the device continues not to respond the request sent from the host, despite that the network or the server resumes its normal operating state after the malfunction has been repaired, and accordingly, it also becomes possible to normally operate the management system even in the above-case by speedily changing the communication mode from the unilateral communication mode back to the bilateral communication mode.

While the preferred embodiments of the present invention have been described using specific term, such description is for illustrative purpose only, and it is to be understood that changes and variations may be made without departing from the spirit and scope of the appended claims.

What is claimed is:

1. An image forming system that is to be operated on a communication network, comprising:
    an image forming apparatus that is coupled to the communication network; and
    a managing apparatus that is coupled to the communication network so as to manage the image forming apparatus;
    wherein a communication mode between the managing apparatus and the image forming apparatus can be set at either a bilateral communication mode, in which the managing apparatus and the image forming apparatus can bilaterally communicate with each other through the communication network, or a unilateral communication mode, in which only the image forming apparatus can unilaterally communicate with the managing apparatus through the communication network, while in an initial communication state, the communication mode is set at the bilateral communication mode; and
    wherein the image forming apparatus is provided with:
    a monitoring section to monitor whether or not it is possible to receive a request sent from the managing apparatus; and
    a first controlling section to conduct such controlling operations that, when the monitoring section determines that it is impossible to receive the request sent from the managing apparatus in the bilateral communication mode currently set, the first controlling section changes the communication mode from the bilateral communication mode to the unilateral communication mode and unilaterally transmits transmission data representing a predetermined content at a predetermined timing to the managing apparatus, and then, when the monitoring section determines that it becomes possible to receive the request, the first controlling section changes the communication mode from the unilateral communication mode to the bilateral communication mode so as to transmit a response to the request back to the managing apparatus; and
    wherein the managing apparatus is provided with:
    a second controlling section to conduct such controlling operations that, when it is impossible to transmit the request to the image forming apparatus, or when it is impossible to receive the response to the request, sent from the image forming apparatus, the second controlling section suspends an operation for transmitting the request, and then, when it becomes possible to receive the response to the request, the second controlling section resumes the operation for transmitting the request.

2. The management system of claim 1,
    wherein the first controlling section transmits the transmission data attached with first switching information, which indicates a fact that the communication mode has been switched from the bilateral communication mode to the unilateral communication mode, while transmits the response to the request, attached with second switching information, which indicates a fact that the communication mode has been switched from the unilateral communication mode to the bilateral communication mode; and
    wherein, when determining that the first switching information is attached to the transmission data, the second controlling section suspends the operation for transmitting the request, while when determining that the second switching information is attached to the response to the request, the second controlling section resumes the operation for transmitting the request.

3. The management system of claim 1,
    wherein, when determining that it is impossible to transmit the transmission data or the response to the request in a first communication method, the first controlling section employs a second communication method, so as to transmit setup data, to be used for establishing a communicative connection in the first communication method, to the managing apparatus.

4. A managing method to be implemented in an image forming system in which a managing apparatus and an image forming apparatus are communicatively coupled to each other through a communication network so as to allow the managing apparatus to manage the image forming apparatus, and a communication mode between the managing apparatus and the image forming apparatus can be set at either a bilateral communication mode, in which the managing apparatus and the image forming apparatus can bilaterally communicate with each other through the communication network, or a unilateral communication mode, in which only the image forming apparatus can unilaterally communicate with the managing apparatus through the communication network, while in an initial communication state, the communication mode is set at the bilateral communication mode, the managing method comprising:
    implementing a first processing that includes operations of: changing the communication mode from the bilateral communication mode to the unilateral communication mode in the image forming system, when a monitoring system of the image forming apparatus detects that it is impossible for the image forming apparatus to receive a request sent from the managing apparatus in the bilateral communication mode currently set, and transmitting transmission data representing a predetermined content at a predetermined timing to the managing apparatus from the managed apparatus; and suspending an operation for transmitting the request in the managing apparatus, when it is impossible for the managing apparatus to transmit the request to the image forming apparatus, or when it is impossible for the managing apparatus to receive the response to the request, sent from the image forming apparatus; and
    implementing a second processing that includes operations of: changing the communication mode from the unilateral communication mode to the bilateral communication mode so as to transmit the response to the request back to the managing apparatus, when the monitoring system of the image forming apparatus detects that it becomes possible for the image forming apparatus to receive the request; and then, resuming the operation for transmitting the request in the managing apparatus, when it becomes possible for the managing apparatus to receive the response to the request.

5. The managing method of claim 4,
    wherein, in the first processing, the image forming apparatus transmits the transmission data attached with first switching information, which indicates a fact that the communication mode has been switched from the bilateral communication mode to the unilateral communication mode, while, when determining that the first switching information is attached to the transmission data, the managing apparatus suspends the operation for transmitting the request; and wherein, in the second processing, the image forming apparatus transmits the response to the request, attached with second switching information, which indicates a fact that the communication mode has been switched from the unilateral communication mode to the bilateral communication mode, while, when determining that the second switching information is attached to the response to the request, the managing apparatus resumes the operation for transmitting the request.

6. The managing method of claim 4, wherein, when it is impossible for the image forming apparatus to transmit the transmission data in the first processing in a first communication method, or when it is impossible for the image forming apparatus to transmit the response to the request back to the managing apparatus in a first communication method, the image forming apparatus employs a second communication method, so as to transmit setup data, to be used for establishing a communicative connection in the first communication method, to the managing apparatus in the second processing.

7. A non-transitory computer readable storage medium storing a computer executable program to be executed by a computer of an image forming apparatus, which is included in an image forming system in which a managing apparatus and the image forming apparatus are communicatively coupled to each other through a communication network which allows the managing apparatus to manage the image forming apparatus, and a communication mode between the managing apparatus and the image forming apparatus can be set at either a bilateral communication mode, in which the managing apparatus and the image forming apparatus can bilaterally communicate with each other through the communication network, or a unilateral communication mode, in which only the image forming apparatus can unilaterally communicate with the managing apparatus through the communication network, while in an initial communication state, the communication mode is set at the bilateral communication mode, the program being executable by a computer to cause the computer to perform a process comprising:

changing the communication mode from the bilateral communication mode to the unilateral communication mode, when a monitoring system of the image forming apparatus detects that it is impossible to receive a request sent from the managing apparatus in the bilateral communication mode currently set, and transmitting transmission data representing a predetermined content at a predetermined timing to the managing apparatus; and then, changing the communication mode from the unilateral communication mode to the bilateral communication mode so as to transmit a response to the request back to the managing apparatus, when the monitoring system of the image forming apparatus detects that it becomes possible to receive the request.

8. The computer readable storage medium of claim 7, the process further comprising:

transmitting the transmission data attached with first switching information, which indicates a fact that the communication mode has been switched from the bilateral communication mode to the unilateral communication mode; and transmitting the response to the request, attached with second switching information, which indicates a fact that the communication mode has been switched from the unilateral communication mode to the bilateral communication mode.

9. The computer readable storage medium of claim 7, wherein, when it is impossible for the image forming apparatus to transmit the transmission data to the managing apparatus, or when it is impossible for the image forming apparatus to transmit the response to the request back to the managing apparatus, the image forming apparatus employs another communication method, so as to transmit setup data, to be used for establishing a communicative connection in the other communication method, to the managing apparatus.

10. A non-transitory computer readable storage medium storing a computer executable program to be executed by a computer of a managing apparatus, which is included in an image forming system in which the managing apparatus and an image forming apparatus are communicatively coupled to each other through a communication network so as to allow the managing apparatus to manage the image forming apparatus, and a communication mode between the managing apparatus and the image forming apparatus can be set at either a bilateral communication mode, in which the managing apparatus and the image forming apparatus can bilaterally communicate with each other through the communication network, or a unilateral communication mode, in which only the image forming apparatus can unilaterally communicate with the managing apparatus through the communication network, while in an initial communication state, the communication mode is set at the bilateral communication mode, the program being executable by a computer to cause the computer to perform a process comprising:

determining that the communication mode is changed from the bilateral communication mode to the unilateral communication mode by the image forming apparatus, when it is impossible for the managing apparatus to transmit a request to the image forming apparatus, or when it is impossible for the managing apparatus to receive a response to the request, sent from the image forming apparatus, to suspend an operation for transmitting the request; and then, determining that the communication mode is changed from the unilateral communication mode to the bilateral communication mode by the image forming apparatus, when it becomes possible to receive the response to the request, to resume the operation for transmitting the request.

11. The computer readable storage medium of claim 10, the process further comprising:

suspending the operation for transmitting the request, when first switching information, which indicates a fact that the communication mode has been switched from the bilateral communication mode to the unilateral communication mode, is attached to the transmission data; and resuming the operation for transmitting the request, when second switching information, which indicates a fact that the communication mode has been switched from the unilateral communication mode to the bilateral communication mode, is attached to the response to the request.

* * * * *